United States Patent [19]
Wiget et al.

[11] Patent Number: 4,718,762
[45] Date of Patent: Jan. 12, 1988

[54] SPECTROPHOTOMETRIC METHOD AND APPARATUS

[75] Inventors: Peter Wiget, Küssnacht; Robert Wolf, Lucerne, both of Switzerland

[73] Assignee: Kontron Holding A.G., Zurich, Switzerland

[21] Appl. No.: 897,966

[22] Filed: Aug. 19, 1986

[30] Foreign Application Priority Data

Aug. 30, 1985 [CH] Switzerland ............ 3753/85

[51] Int. Cl.⁴ .................................. G01J 3/42
[52] U.S. Cl. ........................... 356/319; 250/353; 350/171; 350/394; 356/328
[58] Field of Search ............ 356/305, 319, 325, 326, 356/328, 334; 350/171, 394; 250/345, 353

[56] References Cited
U.S. PATENT DOCUMENTS
3,794,407 2/1974 Nishimura ................... 350/171

FOREIGN PATENT DOCUMENTS
067574 12/1982 European Pat. Off. .

*Primary Examiner*—Vincent P. McGraw
*Attorney, Agent, or Firm*—Jon S. Saxe; Bernard S. Leon; Mark E. Waddell

[57] ABSTRACT

A two-beam spectrophotometer comprising a monochromator and a beam splitter is provided. In addition to being inclined to the optical axis by an angle $\alpha/2$ lying in the optical plane, the beam splitter is inclined to the direction perpendicular to the optical plane, so that the reference beam is deflected out of the optical plane by an angle $\beta$. This improves the spectral intensity distribution.

A spectrophotometric method employing this apparatus is also provided.

14 Claims, 1 Drawing Figure

SPECTROPHOTOMETRIC METHOD AND APPARATUS

BACKGROUND OF THE INVENTION

1. Field of the Invention

This invention relates to a two-beam spectrophotometric method and apparatus, in which a beam of light coming from a light source and dispersed at a monochromator is divided by a beam splitter into a first measuring beam which is passed along the optical axis through a measuring cell to a measuring detector, and a second reference beam which is passed to a reference detector.

2. Description of the Prior Art

Two-beam spectrophotometers (also called spectrometers) are known in the art. To allow spectral analysis with high signal resolution, the base line of such apparatus should be as flat as possible. This means that the spectral intensity distribution of the measuring and reference beams should have a substantially identical curve, but is is well known that this is not the case with the prior art devices and methods.

In certain wavelength ranges considerable intensity fluctuations occur and require the use of complex and expensive electronic equipment for correction. The fluctuations in spectral intensity associated with the prior art devices are largely attributed to polarization effects of the grating in the monochromator and the beam splitter.

SUMMARY OF THE INVENTION

The invention provides an improved two-beam spectrophotometer in which the problem of spectral intensity variations is reduced.

According to the invention, a spectrophotometric method and apparatus are provided in which a beam of incident light from a light source enters a monochromator which passes a beam having a narrowly restricted spectral range. This beam is then divided by a beam splitter into a measuring beam and a reference beam. The measuring beam is passed through a sample and intercepted afterwards by a measuring detector. On the other hand, the beam splitter deflects the reference beam out of the optical plane where it is intercepted by a reference detector. The two detectors emit signals indicative of the intensity of the measuring and reference beams, respectively, which signals ar then analyzed in the usual manner using conventional techniques.

In one embodiment of a two-beam spectrophotometer according to the invention, the beam splitter is inclined with respect to the direction perpendicular to the optical plane.

DESCRIPTION OF THE DRAWING

The preferred embodiment of the invention will now be described with reference to the following drawing, which is merely exemplary and is not meant to limit the scope of the invention in any respects.

DESCRIPTION OF THE PREFERRED EMBODIMENT

Figure 1:
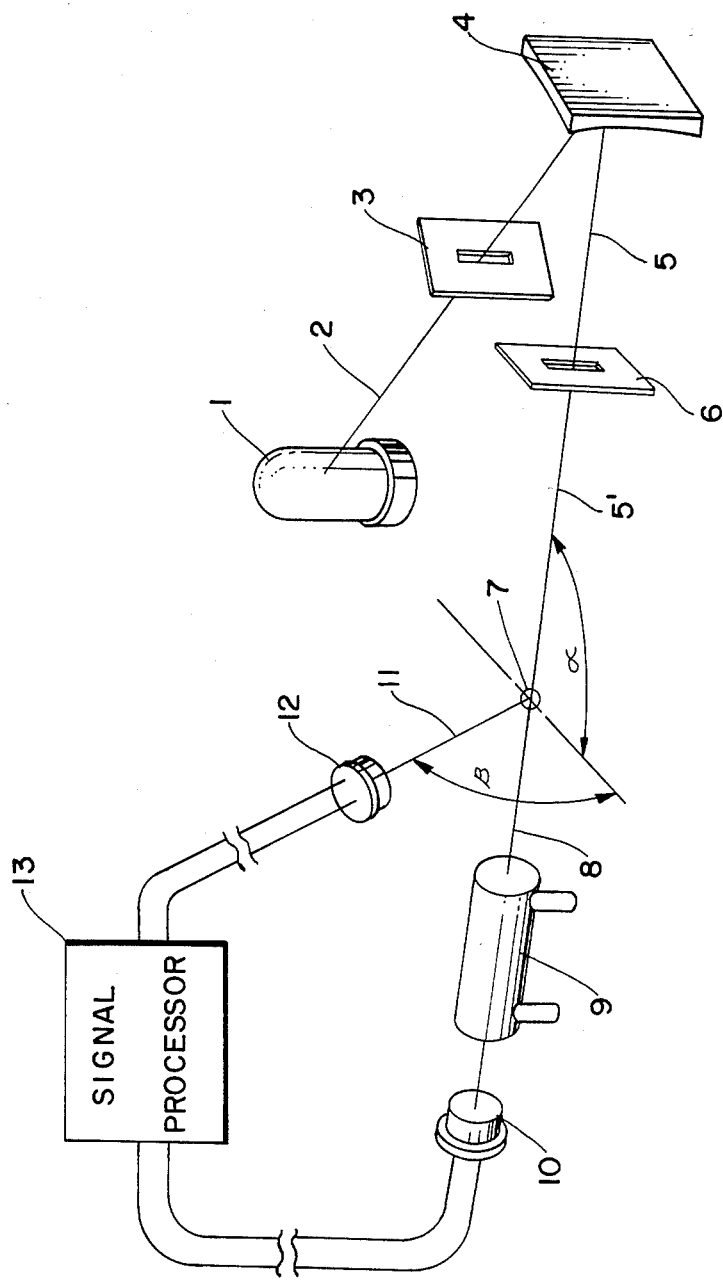
FIG. 1 is a diagrammatic view showing a two-beam spectrophotometer according to the invention.

FIG. 1 shows from left to right a signal processor 13, a measuring detector 10, a measuring cell 9, a reference detector 12, a beam splitter 7, a light source 1, an exit slit 6, an entry slit 3 and a grating 4.

Light source 1 produces an incident light beam 2 which is passed through entry slit 3 to grating 4 which disperses it spectrally as a plurality of light beams 5 each having a different wavelength. The dispersion of beams 5 reflecting off of the grating 4 define an optical plane. The incident beam 2 and beams 5 lie in this optical plane.

The light source 1 may be any of the light sources conventional in spectrophotometry such as, for example, halogen lamps, xenon lamps, hollow cathode tubes, etc, with a continuous or repeating flash emission.

Exit slit 6 passes only a narrowly restricted range (a light beam 5') of the spectrally dispersed beams 5. That is only beams 5 having a wavelength within the narrowly restricted range are passed by exit slit 6 as beam 5'.

The entry slit 3 and the exit slit 6 together with the grating 4 define an apparatus which is generally known as the art as a grating monochromator the operation and structure of which are well known in the art.

The grating 4 may be any of the gratings conventionally used in spectrophotometry such as, for example, holographic gratings etc.

After leaving the exit slit 6 of the grating monochromator, beam 5' proceeds to beam splitter 7 which is formed by a semi-transparent mirror (not shown) or a beam chopper with beam deflection (also not shown). As is conventional, the beam splitter 7 has a reflecting surface which is turned with respect to the optical axis through an angle $\alpha/2$ lying in the optical plane, in order to obtain deflection of a reference beam 11 through an angle $\alpha$. In addition, the reflecting surface (not shown) of the beam splitter 7 is so inclined by a certain angle that the reflected component (the reference beam 11) is taken out of the optical plane through the angle $\beta$.

The angle $\alpha$ is typically about 90°. This angle is, however, not critical. Angles $\alpha$ below 90° may even be advantageous with a view to polarisation effects. Thus, angles $\alpha$ of between 50° and 90° or even below 50° are equally suitable. On the other side one should not go substantially above 90° for $\alpha$. The angle $\beta$ has been found by applicants to have an optimum value of about 45°. Again, this angle is not critical so that deviations in both directions of 10° or even more are acceptable.

The beam splitter 7 allows a portion of light beam 5' to pass through and define measuring beam 8 which continues rectilinearly after passing through the beam splitter 7. Measuring beam 8 is passed through measuring cell 9 (which contains a sample to be analyzed) and detected by measuring detector 10 as is known in the art.

As mentioned above, the beam splitter 7 deflects another portion of beam 5' which deflected portion defines reference beam 11. Reference beam 11 is directed out of the optical plane, due to the aforementioned inclined positioning of the reflecting surface of beam splitter 7, and detected by reference detector 12 which is arranged to be offset from the optical plane by the corresponding angle $\beta$.

Signals indicative of the intensity of measuring beam 8 and reference beam 11 are routed to signal processor 13 for analysis using known techniques. Signal processor 13 comprises conventional circuitry as is known in the art.

This arrangement of beam splitter 7 and reference detector 12 considerably reduces the spectral intensity differences as compared with conventional beam guidance. The invention enables correction to be carried out much more simply in the signal processing stage than was heretofore possible. The baseline of the apparatus is generally greatly improved, thus ensuring higher signal resolution.

The various features and advantages of the invention are thought to be clear from the foregoing description. Various other features and advantages not specifically enumerated will undoubtedly occur to those versed in the art as likewise will many variations and modifications of the preferred embodiment illustrated, all of which may be achieved without departing from the spirit and scope of the invention as defined by the following claims.

What is claimed is:

1. A spectrophotometric method employing a two-beam spectrophotometer, comprising:
    a. transmitting a beam of incident light to a monochromator;
    b. producing a light beam having a narrowly restricted spectral range with the monochromator, wherein the incident light beam is dispersed within the monochromator to thereby define an optical plane by a resulting dispersion of the incident light beam, and wherein the light beam which is produced by the monochromator exits the monochromator traveling in a straight line which defines and optical axis;
    c. intercepting the beam exiting the monochromator in a beam splitter wherein the beam is divided into a measuring beam and a reference beam, the measuring beam passing through the beam splitter and continuing to travel rectilinearly along the optical axis, and the reference beam being deflected by the beam splitter through an angle $\alpha$ to the optical axis and also through an angle $\beta$ with respect to the optical plane with the proviso that the values of $\alpha$ and $\beta$ are such that the reference beam is taken out of the optical plane and away from the optical axis;
    d. passing the measuring beam through a sample;
    e. detecting the intensity of the measuring beam with a measuring detector after the measuring beam has passed through the sample;
    f. detecting the intensity of the reference beam with a reference detector; and
    g. analyzing the respective intensities of the measuring beam and reference beam.

2. The method of claim 1, wherein the angle $\alpha$ is about 90°.

3. The method of claim 1, wherein the angle $\beta$ is about 45°.

4. The method of claim 3, wherein the angle $\alpha$ is about 90°.

5. A two-beam spectrophotometer for spectrophotometrically analyzing a sample, comprising:
    a. a light source for generating an incident beam;
    b. monochromator means for receiving the incident beam from said light source, dispersing the incident beam spectrally, wherein an optical plane is defined by a resulting dispersion of the incident beam, and allowing only a beam within a narrowly restricted spectral range to exit, wherein the beam exiting the monochromator means travels in a line which defines an optical axis, said monochromator means being positioned to receive the incident beam from said light source;
    c. beam splitter means for receiving the beam exiting said monochromator means, allowing a portion of the beam received from the monochromator means to pass therethrough along the optical axis to define a measuring beam, and deflecting another portion of the received beam at an angle $\alpha$ with respect to the optical axis and $\beta$ with respect to the optical plane to define a reference beam with the proviso that the values of $\alpha$ and $\beta$ are such that the reference beam is taken out of the optical plane and away from the optical axis, wherein said beam splitter means is positioned along the optical axis to receive the beam exiting said monochromator means;
    d. a measuring cell for receiving the sample to be spectrophotometrically analyzed wherein the measuring cell is positioned along the optical axis to receive the measuring beam from said beam splitter means and is transparent to the measuring beam along the optical axis;
    e. detector means for detecting the measuring beam after it is passed through the measuring cell and generating a signal which is indicative of the intensity of the measuring beam; said detector means being positioned to receive the measuring beam from the measuring cell; and
    f. reference detector means for detecting the reference beam and generating a signal which is indicative of the intensity of the reference beam, said reference detector being positioned to receive the reference beam from said beam splitter.

6. The two-beam spectrophotometer according to claim 5, wherein $\alpha$ is about 90°.

7. The two-beam spectrophotometer according to claim 5, wherein $\beta$ is about 45°.

8. The two-beam spectrophotometer according to claim 7, wherein $\alpha$ is about 90°.

9. The spectrophotometer according to claim 8, wherein said beam splitter means is positioned along the optical axis and is turned in the optical plane through an angle $\alpha/2$ with respect to the optical axis.

10. The spectrophotometer according to claim 5, further comprising signal processor means in communication with said detector means and reference detector means for receiving the respective signals indicative of the intensity of the reference beam and the intensity of the measuring beam and processing same to provide a spectrophotometric analysis of the sample.

11. The two-beam spectrophotometer according to claim 10, wherein $\alpha$ is about 90°.

12. The two-beam spectrophotometer according to claim 10, wherein $\beta$ is about 45°.

13. The two-beam spectrophotometer according to claim 12, wherein $\alpha$ is about 90°.

14. The two-beam spectrophotometer according to claim 13, wherein said beam splitter means is positioned along the optical axis and is turned in the optical plane through an angle $\alpha/2$ with respect to the optical axis.

* * * * *